United States Patent [19]

Drummond

[11] 3,887,970
[45] June 10, 1975

[54] METHOD OF PRODUCING CRIMPED FIBER GLASS

[75] Inventor: Warren W. Drummond, Allison Park, Pa.

[73] Assignee: PPG Industries, Inc., Pittsburgh, Pa.

[22] Filed: Dec. 18, 1973

[21] Appl. No.: 425,914

Related U.S. Application Data

[63] Continuation-in-part of Ser. No. 363,912, May 25, 1973, which is a continuation-in-part of Ser. No. 274,951, July 25, 1972, abandoned.

[52] U.S. Cl. .............................. 28/72.1; 65/4; 65/9
[51] Int. Cl. ....................... D02g 1/00; C03b 37/04
[58] Field of Search ... 28/15 M, 72 SP, 72.1, 72.12; 65/1, 2, 4, 9, 12, 17

[56] References Cited
UNITED STATES PATENTS

| | | | |
|---|---|---|---|
| 2,344,892 | 3/1944 | Modigliani et al. | 28/72 SP |
| 2,859,506 | 11/1958 | Slayter | 28/1 SM |
| 2,928,121 | 3/1960 | Plumbo | 28/1 SM |
| 3,134,145 | 5/1964 | Miller | 65/9 X |
| 3,442,751 | 5/1969 | Langlois | 65/4 X |
| 3,446,610 | 5/1969 | Riedel | 65/9 |
| 3,511,625 | 5/1970 | Pitt | 28/1 SM |
| 3,746,230 | 7/1973 | Gelin | 65/2 X |

Primary Examiner—Louis K. Rimrodt
Attorney, Agent, or Firm—John E. Curley

[57] ABSTRACT

Crimped fibers in novel form are described in which mats of fiber are provided which are characterized by having the fibers interlocked in both horizontal and vertical directions. A method of preparing such fiber glass mats is described and involves attenuating a plurality of fibers in spaced parallel relationship at extremely high speeds and projecting them onto a collecting surface while they are traveling at high rates of speed to interrupt the flow of fibers and produce by this interruption a plurality of bends in the fibers as they are being collected. The high inertial force inherent in the fibers traveling at high speeds as they strike the collection surface imparts to the fibers a novel crimping action. By collecting a multiplicity of layers of fibers produced in this manner fiber glass mats are produced which have a needled appearance with the glass fibers constituting the mat being interlocked in a multiplicity of directions as well as in the horizontal and vertical plane. Methods of producing these fiber glass mats on collect type winders as well as on continuous belt mat surfaces are described.

12 Claims, 7 Drawing Figures

3,887,970

METHOD OF PRODUCING CRIMPED FIBER GLASS

CROSS-REFERENCE TO RELATED APPLICATIONS

This application is a continuation-in-part of copending application Ser. No. 363,912, filed May 25, 1973, which application is a continuation-in-part of application Ser. No. 274,951, filed July 25,1972, now abandoned.

BACKGROUND OF THE INVENTION

Crimped fibers have been produced in the past by a variety of methods. Thus, stuffing boxes have been utilized for this purpose and a typical operation of this is described in U.S. Pat. No. 3,037,260. Geared wheels have also been used for crimping fibers and this use is described in U.S. Pat. No. 2,348,182. Crimped fibers are desirable especially in the fiber glass product areas so that products having increased resiliency in all directions and compressibility, lightness of weight and good mass integrity are provided. Fibers have also been prepared for utilization in fibrous mats in which the fibers are attenuated onto a deflecting surface and caused to produce a mat consisting of an accumulation of swirled strand portions. This process is described in U.S. Pat. No. 2,875,503 and in U.S. Pat. No. 2,981,999. While these prior art processes are useful in producing crimped fiber, or swirled fibers for use in mat production, some are quite time consuming and rather complicated equipment is required. Further, masses produced by swirled fibers such as described in U.S. Pat. No. 2,981,999 produce products which are, in their forming stage, loosely packed and require considerable processing to render them more dense in appearance and to provide a tight bond between the various layers of fibers.

THE PRESENT INVENTION

In accordance with the present invention a fibrous mass of crimped glass fibers may be provided which has extremely good bonding characteristics between the various fibers forming the mass and which provides for interlocking of the fibers in a plurality of directions. Thus, for example, a fiber glass mat product produced in accordance with the instant invention has extremely high integrity while still exhibiting the characteristics of resiliency, compressibility, lightness in weight and other similar desirable properties for crimped fiber. Thus, in accordance with the instant invention a plurality of glass fibers are projected in a straight line at high rates of speed onto a forming surface which is positioned at right angles to the line of travel of the fibers while they are traveling in a substantially straight line. The abrupt interruption of the straight line path of travel of the fibers by the collection surface causes the fibers to bend against themselves in such a manner that a plurality of bends at the ends of the fibers as they are being collected is imparted thereto. The folding action caused by utilization of the inertial forces present in the fibers as they strike the collection surface, which is in close proximity to the strand's free travel path, i.e., the distance between the end of the attenuation zone and the surface of the collection zone, provides for the crimping of the fibers rapidly and continuously. In general, fiber attenuation in accordance with the instant invention is conducted in such a manner that the fibers are projected in space at speeds ranging between 5,000 to 20,000 feet per minute and the interrupting surface is placed at a distance close enough to the fibers so that essentially little, if any, wave motion is exhibited by the ends of the fibers prior to their contact with the collecting surface. Thus, by striking the collection surface at right angles to the strand travel path and by placing the collection surface close to the point at which fibers are released from the attenuator, maximum utilization of the high inertial forces in the fibers is realized and provides the severe and rapid flexure of the ends at the collection surface to impart the desired crimping action. The crimped fiber glass mass resulting may then be heat treated or chemically treated to provide permanence to the crimped product formed.

The collecting surfaces may take any convenient form and it has been found in accordance with the instant invention that fiber glass mats can be wound directly on a mandrel or collet which is rotating at slow speed as the high speed fibers strike its surface. Fibers can also be prepared in tows and tapes so that the fibers are collected on the collecting surface in tape or tow form and rapidly removed therefrom in this form to provide a thin layered fiber glass structure having interlocking fibers throughout. It is also possible in accordance with the instant invention to provide for the formation of continuous mats on substantially flat surfaces by providing for a reciprocating collection of the rapidly attenuated fibers across a slowly moving mat collection surface. So long as the collection surface is close enough to the fibers being attenuated and projected at high speeds into space so that little or no wave motion has been imparted to the parallel traveling fibers before they strike the collecting surface, the objects of the invention will be achieved.

For a more complete understanding of the instant invention, reference is made to the accompanying drawings in which:

FIG. 4 is a diagrammatic illustration of a portion of the fiber glass mat produced in accordance with the apparatus of FIGS. 1 and 2;

Figure 1:
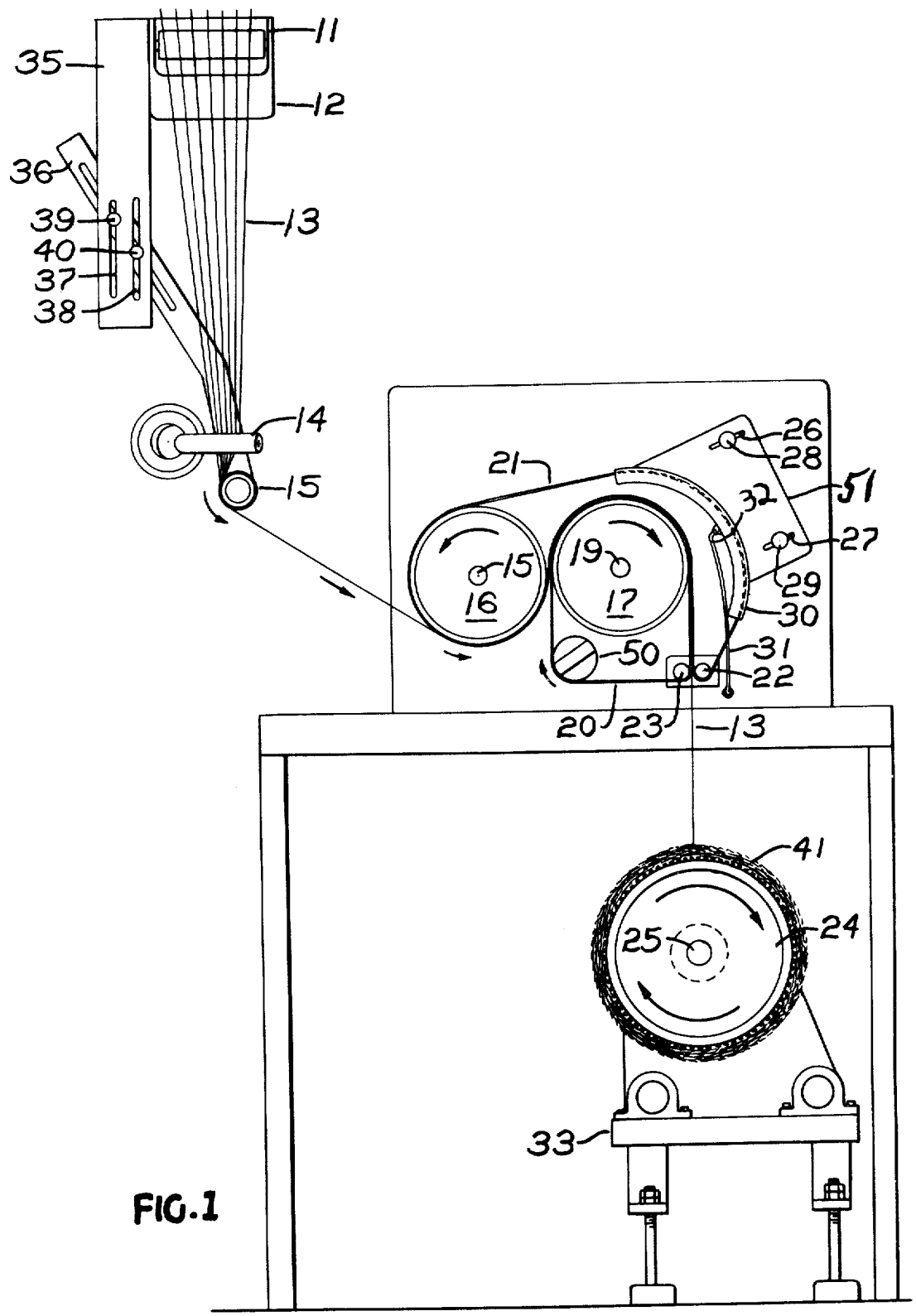
FIG. 1 represents a view in perspective of one embodiment of the instant invention producing mats on a rotating mandrel surface.
Figure 2:
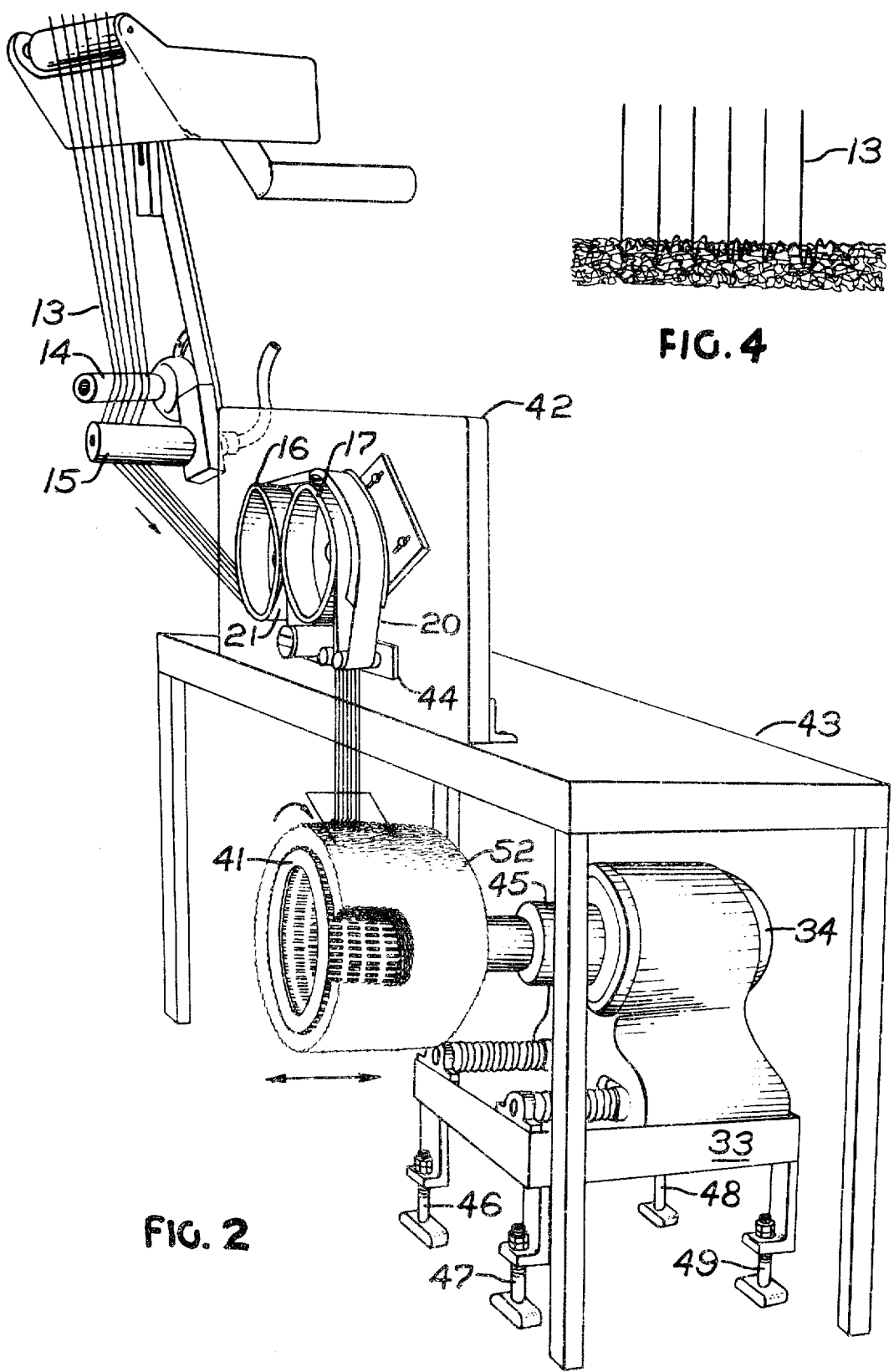
FIG. 2 is a side elevation of the apparatus of FIG. 1.

Turning to the drawings, and FIGS. 1 and 2 in particular, there is shown a plurality of glass fibers 13 being drawn across a roller applicator 11 housed in a reservoir 12 with suitable sizing being applied to the fibers as they are being drawn across the applicator. The applicator is held in place by a bracket 35 having a side arm 36 associated therewith which is adjustable in a vertical direction utilizing the slots 37 and 38 and the bolts 39 and 40. Located on the lower end of the side arm bracket 36 is a guide shoe 15. Positioned directly above the guide shoe 15 and positioned at an angle to the long axis thereof is a strand separator 14.

Also shown in the drawing are two pulleys 16 and 17 which are rotated by drive shafts 18 and 19 associated with a suitable motor not shown. Pulley 16 has a belt 21 associated therewith. Pulley 19 has a belt 20 associated therewith. Tension on the belts can be adjusted by movement of the plate member 51 utilizing slots 26 and 27 therein and the set screws or bolts 28 and 29. Associated with the belt 21 is an air shoe 30 having a suitable air supply line 31 and an air distributing cap 32. Belts 21 and 20 turn around stationary pins 22 and 23 respectively with belt 20 passing over idler 50. Located beneath the stationary pins 22 and 23 is a rotatable mandrel or collect 24 driven by a shaft member 25 associated with a suitable motor 34. The motor is mounted on a table 33 and may be leveled utilizing the leveling foot members 46, 47, 48 and 49 associated with the table 33. Ridges 41 are provided on the surface of the rotating collet 24 to assist in the collection of fibers on that surface and to permit the finished fiber glass mass or mat to be removed easily from the surface of the rotating mandrel 24.

Figure 3:
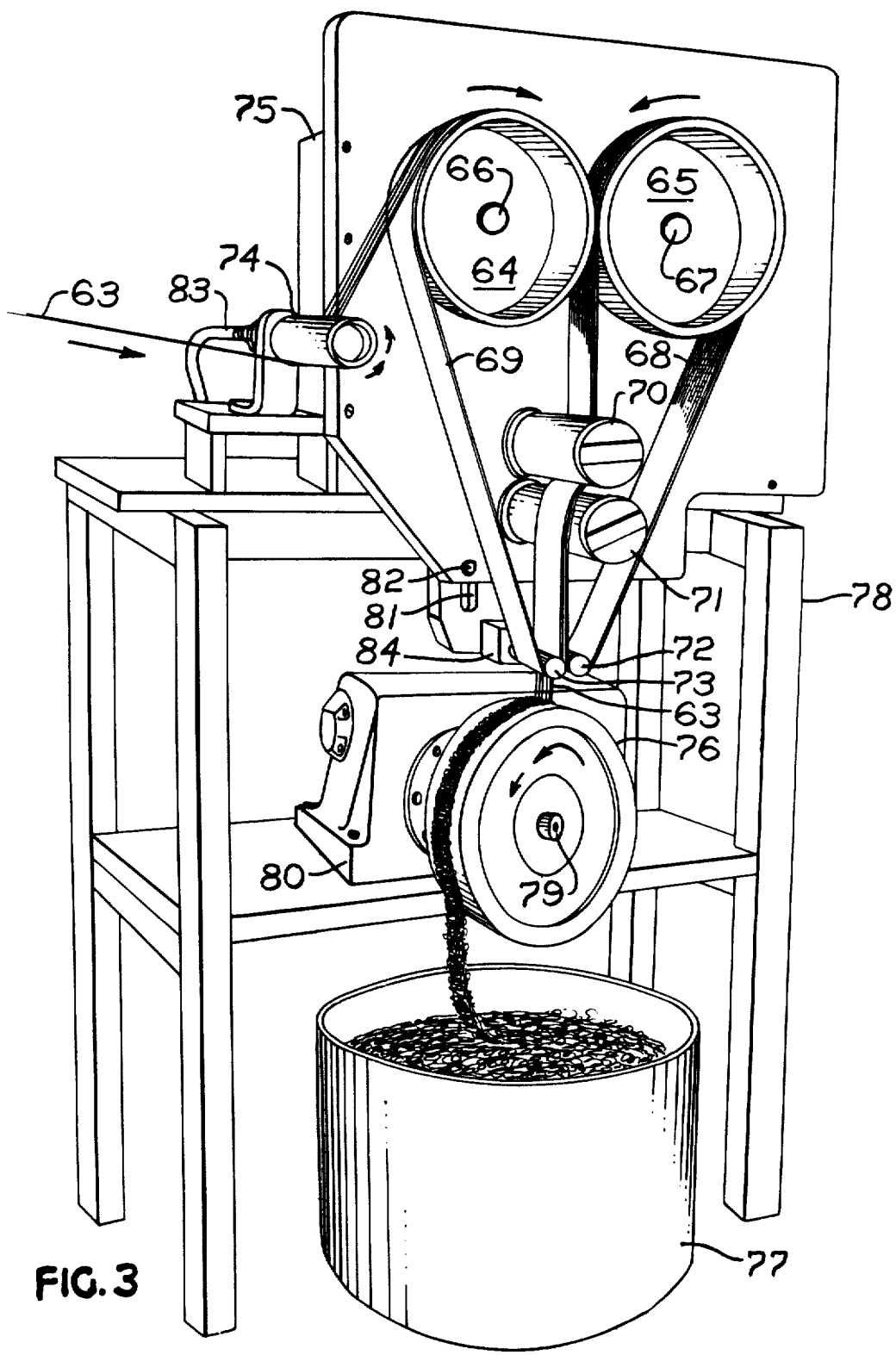
FIG. 3 is a side elevation in perspective of apparatus suitable for producing fiber glass tape utilizing the instant invention.

In FIG. 3 a similar mechanism is shown for producing a fiber glass tape on a continuous basis. As shown in FIG. 3 a plurality of glass fibers 63 are passed under a porous guide shoe 74 supplied with a suitable lubricant for the fibers fed to the shoe via line 83. The fibers are then passed onto a belt 69 associated with a pulley 64 rotated by the drive shaft 66. A second pulley 65 is provided with a suitable drive shaft 67. The drive shafts 66 and 67 are rotated by connection to a suitable motor, not shown. Also provided in association with pulley 65 is a belt 68. Belts 68 and 69, idler 70 and 71 project fibers 63 located between the belts downwardly in a straight line to the stationary pivot pins 72 and 73. As the belts pass over the pivot pins 73 and 72, they are reflexed in the opposite direction and returned to the pulley. Located below the guide pins 71 and 72 is a collecting surface 76 which is rotating at high speed and is driven by drive shaft 79 associated with motor 80. A storage or collecting bin 77 receives the product as it is released from the surface of the collector surface 76. The entire unit is mounted on a suitable table 78.

In FIG. 4 a portion of a mat formed on the rotating mandrel 24 of FIG. 2 and cut from the surface of the mat 52 shown therein depicts the orientation of the crimped glass fibers as they appear in the finished product. It is to be noted that the fibers are interlocked and that the projection of the fibers 13 onto the mat surface as it is being formed is such that the penetration to a considerable depth below the surface of the mat as it is being formed is accomplished due to the high velocity of travel of the fibers as they are collected on the slowly rotating mandrel. Thus, the high inertial forces provide crimped fibers which as the mat is formed, provide a mat structure which has the appearance of a needled mat though no needling was used.

Figure 5:
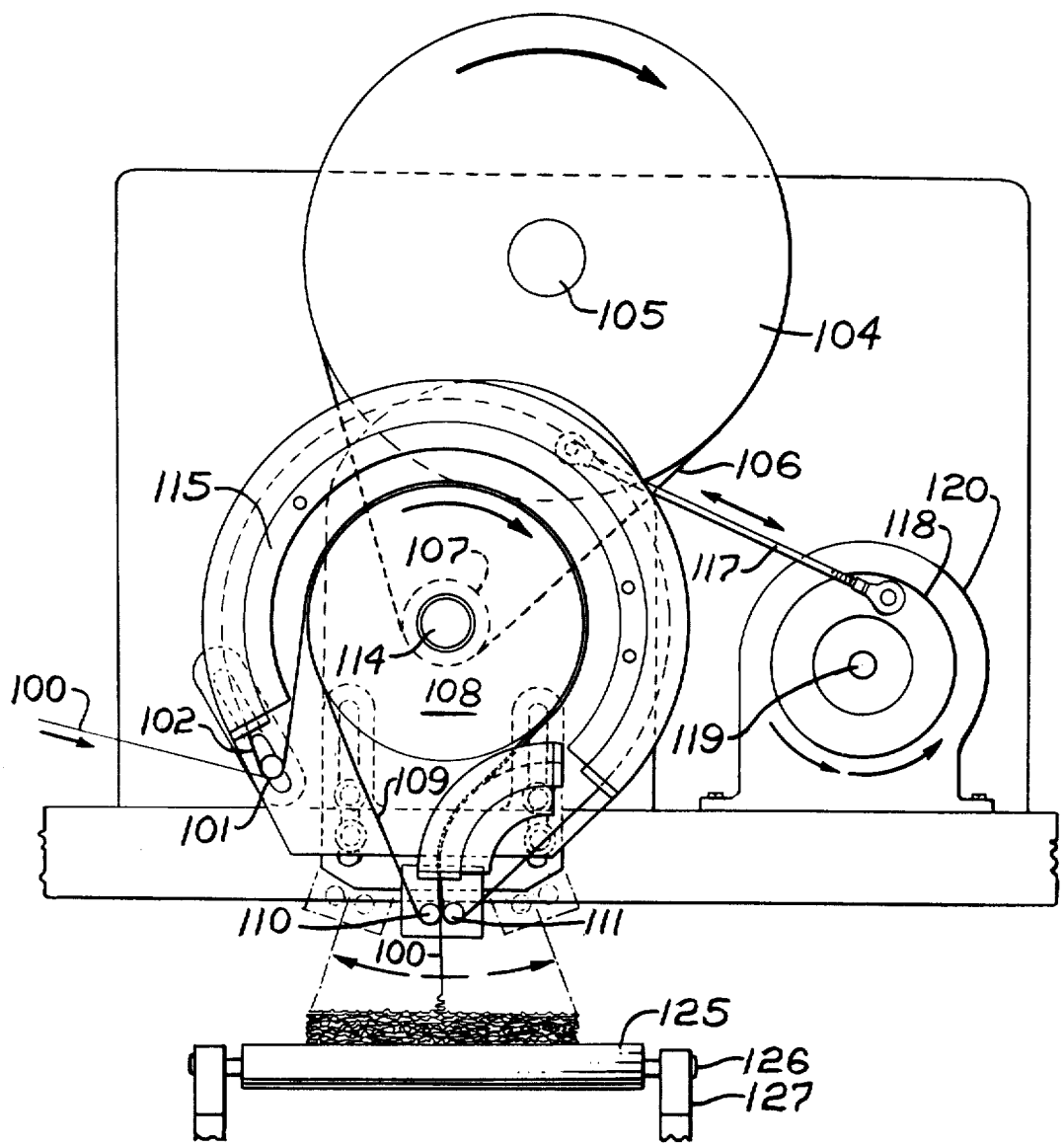
FIG. 5 shows apparatus suitable for laying down a flat mat on a continuous belt for the production of fiber glass mat utilizing the instant invention.

In FIG. 5 a further modification of the instant invention is shown which is suitable for utilization in preparing a continuous fiber glass flat mat formed on a belt type conveyor. In FIG. 5 fiber glass strands 100 are passed across the stationary pin 101 and on top of a belt member 102. Also shown in FIG. 5 is a large pulley 104 connected to a suitable drive shaft member 105 of a motor, not shown, and having a belt 106 associated therewith. Belt 106 revolves around pulley 107 mounted on shaft 114 over a second pulley 108 also mounted on shaft 114 to impart rotation thereto. Pulley 108 has also associated with it a second belt member 109 affixed to the surface of pulley 108 and revolving around the pulley and stationary pin 110. Belt 101 travels on the outer surface of the pulley 108 on top of belt 109 and is turned around a second stationary pin member 111. The pulley 107 is rotated on a pivot pin or shaft 114 which rotates pulley 108. Support member 115 associated with belts 102 and 109 is movable in a sidewise direction on the outside of the shaft through bearing supports not shown in the drawing. Bolted to the frame of the apparatus is a rocker arm 117 which is affixed to a pulley 118 associated with the drive shaft 119 of a secondary motor 120 to impart reciprocal motion to the entire frame assembly by pivoting the assembly and its associated belts 109 and 102 revolving around pulley 108 on the bearing supports for the shaft 114 as stated above. The strand 100 is directed in a straight line from between the belts 109 and 102 as they pass the stationary pins 110 and 111 and are collected on a forming surface 125 which may comprise an endless belt such as a chain conveyor rotated on a shaft member 126 coupled to a suitable cam shaft 127 which is connected to a motor (not shown).

In operation of the embodiments shown in FIGS. 1 and 2, fiber glass strands 13 are drawn from a bushing, not shown, across an applicator 11 and a suitable lubricant such as an amino silane is applied thereto. Any conventional glass fiber lubricant may be used, providing the resultant crimped fibers are not lubricated to the extent that the crimp releases due to a lack of friction. Typical of lubricants found acceptable for these purposes are water, gamma methacryloxypropyl silane, gamma amino propyl silane, emulsified epoxy resins and the like. The strands 13 as they are drawn downwardly across the applicator are passed across the separator 14 which is positioned slightly across the guideshoe 15 and imparts sufficient force to the fibers as they are being drawn around the guideshoe 15 to maintain the strands in a separated position as they pass under the shoe 15. The fibers are then picked up on the underside of the belt 21 as it revolves around pulley 16 and on the outside surface of belt 20 as it revolves about pulley 17. Belts 21 and 20, with the separated strands sandwiched in between, travel around the pulley 17 and downwardly until they reach the stationary pins 22 and 23. At this point the parallel strands 13 are projected downwardly at high speed until they reach the stationary pins 22 and 23. At this point the parallel strands 13 are projected downwardly at high speed until they strike the surface 41 of the rotating collet 24. Upon striking this surface, which is at right angles to the path of travel of the strands, each of the strands is bent as the strand travels to the surface on the approximate order of 2 to 4 sharp bends or more per linear inch of strand. The bends are counted by measuring a length of the product in the stretched condition and relaxing it after measurement of its length to count the flexes in the length measured. The strand 13 as it travels over the stationary pins 22 and 23 travels at rates of speed varying between 5,000 to 20,000 feet per minute. The collet member 24 is revolving at approximately 500 to 1500 peripheral feet per minute and the operation is continued until a mat of any desired depth is produced on the collet member 24. When the strands have reached the desired depth the mat is pulled from the collet and the mandrel is ready for further collection of strands. The motor 34 associated with the collet 24 in addition to imparting rotational movement to the winder or collet 24 reciprocates in a horizontal direction at speeds of travel between 3 and 30 feet per minute thereby permitting the strand to build up across the face of the periphery of the winder 24 while the winder 24 is being rotated at slow speed. This provides for a uniform deposition of strand across the surface 41 of the winder 24 while it is rotating to provide for uniform deposition around the winder also. Donut shaped packages of crimped fiber glass of any uniform thickness are thereby formed on the winder 24.

In the device shown in FIG. 3 the fiber glass is fed on the underside of the guideshoe 74 which has its surface lubricated with a fiber glass lubricant such as an amino silane through hose 83 and the strand is then passed between belts 69 and 68 as they rotate around pulleys 64 and 65 respectively. The strands while in spaced parallel relationship are caught between the belts 68 and 69 and are passed down between two guideshoes 70 and 71 to flatten the belt members and insure the uniform positioning of the strands in spaced relationship with respect to each other. The belts 68 and 69 supply adequate tractive force to provide attenuation of the fiber glass without slippage on the belts. The belts 68 and 69 then travel down between the two stationary pins 72 and 73 which are in parallel alignment with each other at their under surfaces. The belts take a sharp turn at this point and project all of the strands 63 in a vertical direction downwardly onto a rotating wheel 76. Wheel 76 is turning at 50 to 100 peripheral feet per minute. The strands are rapidly crimped with 2 to 4 or more sharp bends per linear inch and the tape formed falls off the surface, preferably a smooth surface of metal or rubber, of the rotating member 76 and into the collection device 77 by gravity. This forms a fiber glass tape or tow which has interlocked fibers in a thin layer caused by the multiple bends in the parallel aligned fibers striking the collection surface of member 76. While the wheel surface is preferably metal, hard rubber, ceramic or plastic surfaces and the like may be used. In addition the collection surface, member 76, may be a grooved pulley on which a strand of glass fiber yarn may be introduced to provide tensile strength to the fiber glass tape or tow.

In the device shown in FIG. 5 the paralleled strands 100 are passed under the belt moving over stationary air pin 101 onto the top surface of the belt 102. The strands are caught between this belt and belt 109 as they pass upwardly to the periphery of the pulley 108. The strands once again are passed over a suitable guideshoe, not shown, in FIG. 5 to maintain the individual strands in an essentially spaced parallel relationship with respect to each other. The strands are passed around the pulley 108 between the two belts until they reach the stationary guidepins 111 and 110. At this point belt 102 is bent and returned to the stationary pin 101 and belt 109 is flexed and turned back to the surface of pulley 108. The strands 100 are projected at high speed in a vertical direction into space. During this operation motor 120 is activated and the armature 119 rotates the disc 118 to impart to the rod 117 a reciprocating motion. The rod 117 pushes the entire attenuating device first to the left and then returns it to the right. This reciprocates the stationary pins 110 and 11 and their relationship to the collecting surface 125 so that the fibers contact the surface all across the stationary belt 125 which is moving at a slow rate of speed due to the rotation of the shaft 126 by its connection 127 to a second motor not shown. The driving force for the pulley 108 is supplied by pulley 104 which is associated with a drive shaft 105 connected to a second motor. As the strands move from the belts 109 and 102 in a vertical direction against collecting surface 125 the strand is collected in a horizontal direction in two planes, that is, the strand is collected along the width of the roll 125 and along its length as it moves in the horizontal plane by rotation of shaft 126.

In connection with the collection surfaces utilized to provide crimped fiber in accordance with the instant invention care must be taken to insure that the surfaces are placed close enough to the projecting strands to take advantage of the inertial forces provided by the high speed of travel in a straight line that the strands undergo as they are ejected from the stationary pins in the devices shown in FIGS. 1, 2, 3 and 5. In general high strand integrity and good crimping are obtained in accordance with the instant invention by insuring that the fiber glass during its travel to the collecting surface is carried between two belts. The belts may be constructed of any suitable material. If desired, solid wheel surfaces may be utilized in lieu of belts provided that the strands are attenuated thereby in side by side parallel relationship with respect to each other. In the preferred method of attentuation, i.e., pulling the spaced parallel fibers between the two belts, good projection of the fibers from the attenuating apparatus is provided since a sharp bend can be imparted to the belts which will readily eject the fibers in a straight line when the pulleys are operated at the normal high velocity operating speeds.

In general the pulleys are operated at peripheral speeds of between 5,000 to 20,000 feet per minute, preferably between 8,000 and 14,000 feet per minute to provide at the point of ejection, fiber strand travel speeds ranging between 5,000 to 20,000 feet per minute and preferably 8,000 to 14,000 feet per minute. It is preferable to provide as many crimps or bends as possible per linear inch of fiber length by placing the collecting surfaces as close as possible to the point of ejection of the fibers from the attenuating apparatus as practical and at substantially right angles thereto while still providing sufficient area to collect a package of sufficient depth. While it is preferred to collect the high velocity strand at right angles to the path of travel, the angle can be varied as in FIG. 5 so that the strand strikes the surface at an angle of 80° to 90°. Typically, at the 5,000 to 20,000 feet per minute travel speeds of the fibers, the collection surface is placed between about 1 to about 6 inches from the point of ejection of the fibers into space, preferably 3 to 4 inches. The important consideration is that the fibers be not permitted to exhibit any substantial wave motion prior to their touching the collection surfaces. By providing winders that can be varied in their vertical positioning with respect to the point of ejection of the fiber glass strands as the package is collected, maximum crimping is easily obtainable and package depth can be readily varied.

In FIGS. 1 and 2 it is to be noted that the surface 41 of the collecting material contains a plurality of projections thereon. These projections are polished, smooth surfaced, irregularities provided on the surface of the mandrel tp permit the inertial crimped fiber packages to be collected on the surface without slipping from the mandrel surface. It is found when packages of considerable depth are collected on the winder 24 that smooth surfaces in addition to rendering collection difficult also render the product quite difficult to remove. By providing the ribbed members on the surface 41, with small indentations in between each one, the packages are easily formed on the rotating mandrel. While raised projections have been utilized in the preferred embodiment of this invention, recourse to perforations may also be had to provide a collection surface.

In the preferred embodiments shown in FIG. 1 for providing a circular shaped package of crimped fibers, metal surfaces have been employed and in particular materials such as stainless steel have found particular utility. In the embodiments shown in FIG. 3, where a continuous strip of fiber glass is produced from a plurality of spaced apart parallel strands 63, rubber wheels have been found to be particularly effective. Metal may be employed here if desired and other materials such as graphite may also be employed. The collecting surface 125 of FIG. 5 may be any continuous smooth fabric or thin metal belt type mat former and this embodiment is therefore readily adaptable to conventional mat forming equipment.

The products produced by the instant invention are found to be quite well bonded together and have the appearance of a needled mat when collected to any substantial depth, that is, depths greater than one-eighth of an inch or more. They are difficult to pull apart and the fibers are found to be interlocked in random directions since the fibers as they are fed to the product collection surface continuously puncture the surface of the glass collected to a substantial depth as they are being crimped.

The crimped products produced in accordance with this invention inherently possess substantial potential energy which must be dissipated to produce a permanence to the crimped fibers. Thus, after formation the products are typically placed in a heating zone operating at sufficient temperature to physically relax the glass fibers and form a permanent crimp. Typically this procedure involves heating the glass to temperature of 800°F. to 1400°F. or higher for a period of time sufficient to accomplish the physical relaxation of the crimped fibers. In general, it is not necessary to heat the glass to its softening point. The time of treatment will vary depending on the temperature employed and in general the higher the temperature of the heat treating zone, the less time will be required to accomplish the physical relaxation and consequent permanent crimp set. In a temperature range of 800°F. to 1200°F. in a heat treatment zone time of treatment can range between 1 to 15 minutes or more for example. The heating means employed can be varied and radiant heaters, gas ovens and hot air chambers are typical of some acceptable forms that it may take.

Crimped fiber products formed by the method and apparatus of the instant invention are particularly useful for the filtration of solids from liquids, solids from gases, solids and liquids from gases, and liquids from gases. Hence, crimped fibers can be used for filtering particulate solids and liquids produced in welding procedures, for filtering the carbonaceous smoke and particulate metallic products formed in the combustion process of diesel engines, for filtering particulate lead, carbonaceous smoke and noxious compounds from the exhaust gases of internal combustion engines, for filtering insoluble particulate products from liquids to clarify and purify such liquid and for filtration of other liquid and/or gaseous streams.

Figure 6:
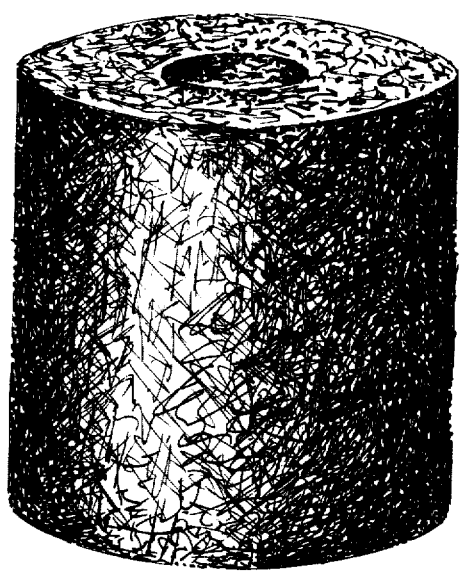
FIG. 6 is an illustration of a crimped package of glass fibers removed from the forming tube and placed on end.
Figure 7:
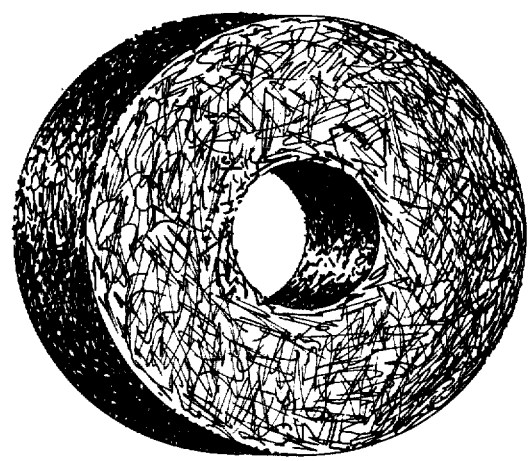
FIG. 7 is an end view of the package of FIG. 6 depicting the hollow interior.

The configuration of a filtration media of crimped fiber is selected according to the particular application for which it is used and/or the particular housing in which it is contained. However, it has been found that a crimped fiber filter media, having the configuration of element 52 of FIG. 2 and further illustrated by FIGS. 4, 6 and 7 is particularly useful for a variety of filtration purposes. Element 52 of FIG. 2 and FIGS. 6 and 7 both show a crimped fiber mass in a generally cylindrical configuration having an open cylindrical channel through the center thereof.

The crimped fiber products can also be used for a variety of purposes in addition to filtration such as reinforcement for thermoplastics, insulation products, woven fabrics and textile yarns. In its various applications it will be understood that conventional lubricants, sizes and binders used on glass for these purposes may be applied to the product to prepare it for these applications. Thus, binders such as conventional phenol formaldehyde resins may be employed for insulation products for example. Typical of these type binders are those described in U.S. Pat. Nos. 3,215,585 and 2,990,307. For textile uses any of the conventional textile sizes may be used. Typical sizes of this character are described in U.S. Pat. No. 3,167,468. Various latex materials and resorcinol formaldehyde resin may be utilized where the crimped product is to be used for rubber reinforcement. A typical description of such binders is disclosed in U.S. Pat. No. 3,533, 830. For resin reinforcement various resin binders and sizes may be employed. Examples of such binders are contained in U.S. Pat. Nos. 3,437,517 and 3,437,550. It may be desired in applying binders and sizes to employ conventional coupling agents such as organo silicon compounds such as vinyltrichlorosilane, gamma-aminopropyltriethoxy silane and other like materials. Similarly cationic softeners, anti-static agents and other conventional fiber glass additives may be used to enhance the properties of the crimped fibrous masses of the instant invention for a particular end use.

While the invention has been described with reference to certain specific examples and illustrative embodiments, it is not intended to be limited thereby except insofar as appears in the accompanying claims.

I claim:

1. A method of producing crimped fiber glass mat comprising passing a plurality of fiber glass strands in an essentially parallel relationship with respect to each other through an attenuating device operating to produce a high rate of speed in the parallel strands, rapidly projecting the parallel strands being attenuated at a high rate of speed in a substantially straight line from the attenuator, interrupting the path of travel of the paralleled strands by imposing a collection surface for the strands in their path of travel and in close proximity thereto while they are being transmitted in a straight line and before any substantial wave motion is imparted to the paralleled strands and collecting an interlocked fiber glass product on said collection surface.

2. The method of claim 1 wherein the collected product is heat treated to set the crimp.

3. The method of claim 1 wherein the collected product is chemically treated to permanently set the crimp.

4. A method of producing a mass of crimped fiber glass comprising passing a plurality of fiber glass strands into an attenuation zone, maintaining the strands in an essentially parallel relationship with respect to each other as they pass through said attenuation zone, operating said zone to produce in the paralleled strands passing therethrough a high rate speed, rapidly projecting the paralleled strands from said zone at the said high rate of speed and in a substantially straight line, interrupting the path of travel of said paralleled strands with a collection surface placed in their path of travel and in close enough proximity thereto so that their path of travel is interrupted before any substantial wave motion is imparted to the strands while they are in parallel and traveling at said high rate of speed and collecting an interlocking fiber glass product on said collection surface.

5. The method of claim 4 wherein the collected product is heat treated to set the crimp.

6. The method of claim 4 wherein the collected product is chemically treated to permanently set the crimp.

7. A method of producing a crimped fiber glass mat comprising feeding a plurality of fiber glass strands maintained in parallel relationship with respect to each other to an attenuation zone, imparting to said paralleled fiber glass strands while they pass through said attenuating zone high velocities, projecting the strands from said attenuation zone into space with velocities such that they travel in a straight line and are maintained parallel with respect to each other, imposing a collection surface in close proximity to the point of projection of said paralleled fiber glass strands from said attenuation zone and before any substantial wave motion has been imparted to the strands, collecting said strands on the surface utilized to interrupt their path of travel to thereby cause the fibers to flex upon themselves as they are collected thereon to form on the collection surface an interlocked fiber glass mat.

8. The method of claim 7 wherein the collecting surface is rotating at slower speed than the attenuation surfaces and is reciprocating in a horizontal plane to provide for collection across the entire face and circumference of the collecting surface.

9. The method of claim 7 wherein the collecting surface is a mat forming surface and the attenuation mechanism is moved across the surface of the collecting surface to provide collection of fibers across the surface and along the length thereof.

10. A method of producing a mass of crimped fiber glass comprising passing a plurality of fiber glass strands into an attenuating zone while maintaining the strands during feeding through said zone in a parallel relationship with respect to each other, imparting to said fiber glass strands in said attenuation zone high rates of speed, projecting the fibers into space from said attenuation zone in a substantially straight line and in parallel with respect to each other at speeds of at least 5,000 feet per minute, providing a collection surface in the path of travel of the said strands at a distance of between about 1 to about 6 inches from the point of projection of the strands from said attenuation zone, reciprocating the collection surface to provide for a collection across the said surface and simultaneously rotating the surface at speeds of between 500 to 1500 peripheral feet per minute to thereby continuously collect strands around and across the collection surface and to permit the strands to crimp on said collection surface and provide a mass of crimped fiber glass strands thereon having the strands interlocked with one another in random directions.

11. The method of claim 10 wherein the fibers are projected at speeds of 5,000 to 20,000 feet per minute, the rotating collection surface is reciprocating at about 3 to 30 feet per minute, and wherein the surface is between 3 to 4 inches from the point at which the fibers are projected into space.

12. A method of producing a crimped fiber glass tape comprising passing a plurality of fiber glass strands into an attenuation zone and in parallel relationship with respect to each other, attenuating said fiber glass strands in said zone at a high rate of speed and while the strands are maintained in an essentially parallel relationship with respect to each other, rapidly projecting the strands from said attenuation zone at a high rate of speed and in a substantially straight line, interrupting the path of travel of the strands by imposing a smooth rotating surface in the path of the strands while they are being transmitted in a straight line and in parallel relationship with respect to each other, rapidly forming an interlocked fiber glass tape on said rotaitng surface and expelling the tape so formed from said rotating surface continuously.

* * * * *